A. FORSTER AND J. H. BROWN.
STARTING AND STOPPING OF INTERNAL COMBUSTION ENGINES.
APPLICATION FILED JULY 15, 1918.

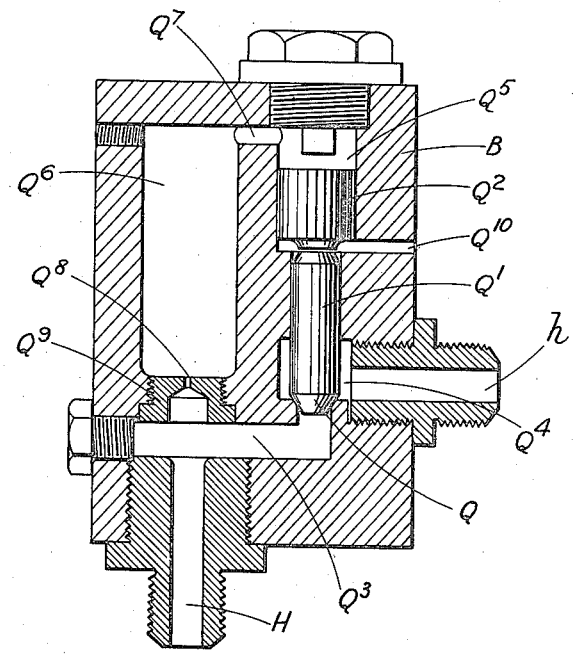
FIG.5.
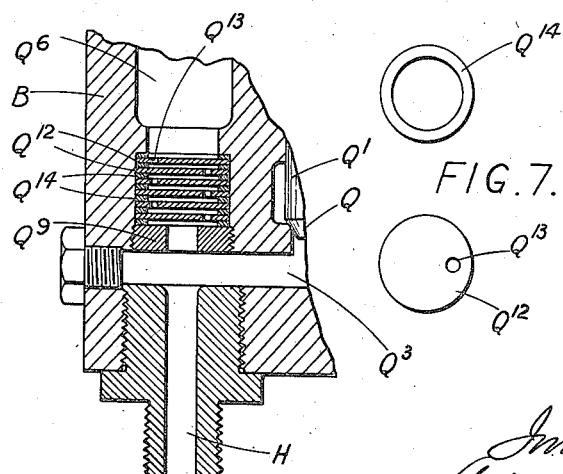
FIG.6.
FIG.7.

1,323,686.

Patented Dec. 2, 1919.

Inventors:
Andrew Forster
James H. Brown
by Foster Freeman Watson & Coit
Attys

A. FORSTER AND J. H. BROWN.
STARTING AND STOPPING OF INTERNAL COMBUSTION ENGINES.
APPLICATION FILED JULY 15, 1918.

Patented Dec. 2, 1919.

UNITED STATES PATENT OFFICE.

ANDREW FORSTER AND JAMES HENRY BROWN, OF ISLE OF WIGHT, ENGLAND, ASSIGNORS TO J. SAMUEL WHITE & COMPANY, LIMITED, OF EAST COWES, ISLE OF WIGHT, ENGLAND.

STARTING AND STOPPING OF INTERNAL-COMBUSTION ENGINES.

1,323,686.  Specification of Letters Patent.  Patented Dec. 2, 1919.

Application filed July 15, 1918. Serial No. 245,017.

*To all whom it may concern:*

Be it known that we, ANDREW FORSTER and JAMES HENRY BROWN, subjects of the King of England, and residing, respectively, at Isle of Wight, in England, have invented certain new and useful Improvements in Starting and Stopping of Internal-Combustion Engines, of which the following is a specification.

This invention relates to internal combustion engines of the Diesel multi-cylinder type and has for its object to provide improved mechanism by means of which starting in either direction and stopping are controlled and effected by compressed air.

In certain existing constructions of engine of this type the starting is brought about by first admitting compressed air to all the cylinders, either with or without simultaneous fuel injection, and then when the engine has started the supply of air to some of the cylinders is cut off so that while some cylinders continue to receive compressed air the other cylinders are supplied with combustible charges. Finally the air is cut off from the remaining cylinders so that all then run on combustible mixture. It has been found however that when starting with air in all the cylinders there is a danger that air may continue to be supplied to the cylinders or certain of them for such an unnecessary length of time as to cause freezing within the cylinders as a result of the expansion of the air therein. This results in the temperature produced by compression being reduced for some revolutions after starting air is cut off below that which is necessary to effect the combustion of the fuel so that starting of the engine is prevented or delayed and compressed air is wasted. Experience has shown that it is sometimes possible to start such an engine by supplying air only to certain of the cylinders while fuel is supplied to the remaining cylinders but this cannot be effected unless the cranks are in favorable positions and it may then be necessary to turn over the crank shaft in order to bring the cranks into such positions. By means of the present improvements it is possible to start the engine without admitting air to all the cylinders and irrespective of the position of the cranks. Simple hand controlled mechanism is employed for this purpose while waste of air and risk of freezing is obviated.

According to this invention there is provided one ahead starting valve and one clearing or pressure relief valve with or without one astern starting valve whereby a supply of air to the cylinders for starting in one or in the other direction and to the fuel valves for injection is controlled as also the pressure relief from the cylinders for stopping, all the three valves being hand operated by the movement of a single lever. The single ahead starting valve and the single astern starting valve may be similar and each controls a system whereby compressed air can be delivered to the cylinders. In each of these systems is a valve by means of which the supply of starting air to certain of the cylinders is automatically cut off while another valve which is in communication with each of the systems automatically controls the fuel injection air to the cylinders this latter valve being also controlled by a single clearing or pressure relief valve. The pneumatic control system thus comprises three hand operated valves respectively for ahead starting, clearing and astern starting and these starting valves control the supply of starting air for either ahead or astern when the flow of this air to certain of the cylinders after a suitable period is cut off by automatic valves. The starting air also automatically actuates a valve which controls the fuel injection air and this valve can also be actuated and the fuel injection air automatically cut off when the clearing valve is operated. Pipe connections for starting air are provided from the two starting valves to the cylinders and in each of these pipe connections is an automatic valve by which the supply of starting air to certain of the cylinders is cut off after this air has flowed to the cylinders for a suitable period. The automatic valve which controls the fuel injection air is actuated by the starting air in either of these pipe connections. There are also pipe connections between the cylinders and the hand operated clearing valve and between this valve and the automatic valve which controls the fuel injection air together with or without an automatic main starting air relay valve which latter is actuated by air from each of the pipe connections between the cylinders and the hand operated starting valves. The cylinders may be grouped or coupled together in various ways by these pipe connections so as to be controlled in groups by the starting valves.

The invention may be put into practice in various ways as found desirable and in accordance with the type of engine to which the improvements are applied. The accompanying drawings illustrate by way of example how the invention may be employed and also the valve construction as preferably used. In these drawings, Figure 1 is a diagrammatic view showing the air control system as applied to a six cylinder engine.

Fig. 5 is a longitudinal sectional elevation of one construction of the time or period valve.

Fig. 6 is a similar view of a portion of the valve shown in Fig. 5 and illustrating an alternative arrangement of the air leak in that valve.

Fig. 7 shows in plan a ring and a disk such as used in the construction illustrated in Fig. 6.

Like letters indicate like parts throughout the drawings.

Assuming that the engine to which the invention is applied is a six cylinder engine the cylinders A are grouped in the connections to the control system in sets of three, cylinders Nos. 1, 2 and 3 for example being in one group while cylinders Nos. 4, 5 and 6 are in the other group. This grouping is such that if at starting the cranks on which act the pistons in cylinders 1, 2 and 3 do not happen to be in the correct positions to enable the engine to be started when air is admitted to these cylinders then at any rate one or more of the cranks on which act the pistons of cylinders Nos. 4, 5 and 6 will be in such a position as to be operative. The time during which air is admitted to cylinders 4, 5 and 6 is however controlled automatically by the time or period valve B provided for this purpose in the air system so that as soon as the crank shaft has been turned over sufficiently to make the pistons in cylinders Nos. 1, 2 and 3 operative, or very shortly after this has occurred, the air supply to cylinders Nos. 4, 5 and 6 is shut off and fuel is supplied to them while air continues to be delivered to cylinders Nos. 1, 2 and 3. These latter cylinders are then used to continue the turning of the crank shaft until the engine is fairly started on the combustible mixture in cylinders 4, 5 and 6 when the air supply to cylinders 1, 2 and 3 is cut off by the operation of the hand control and fuel is delivered to them.

Figure 1:
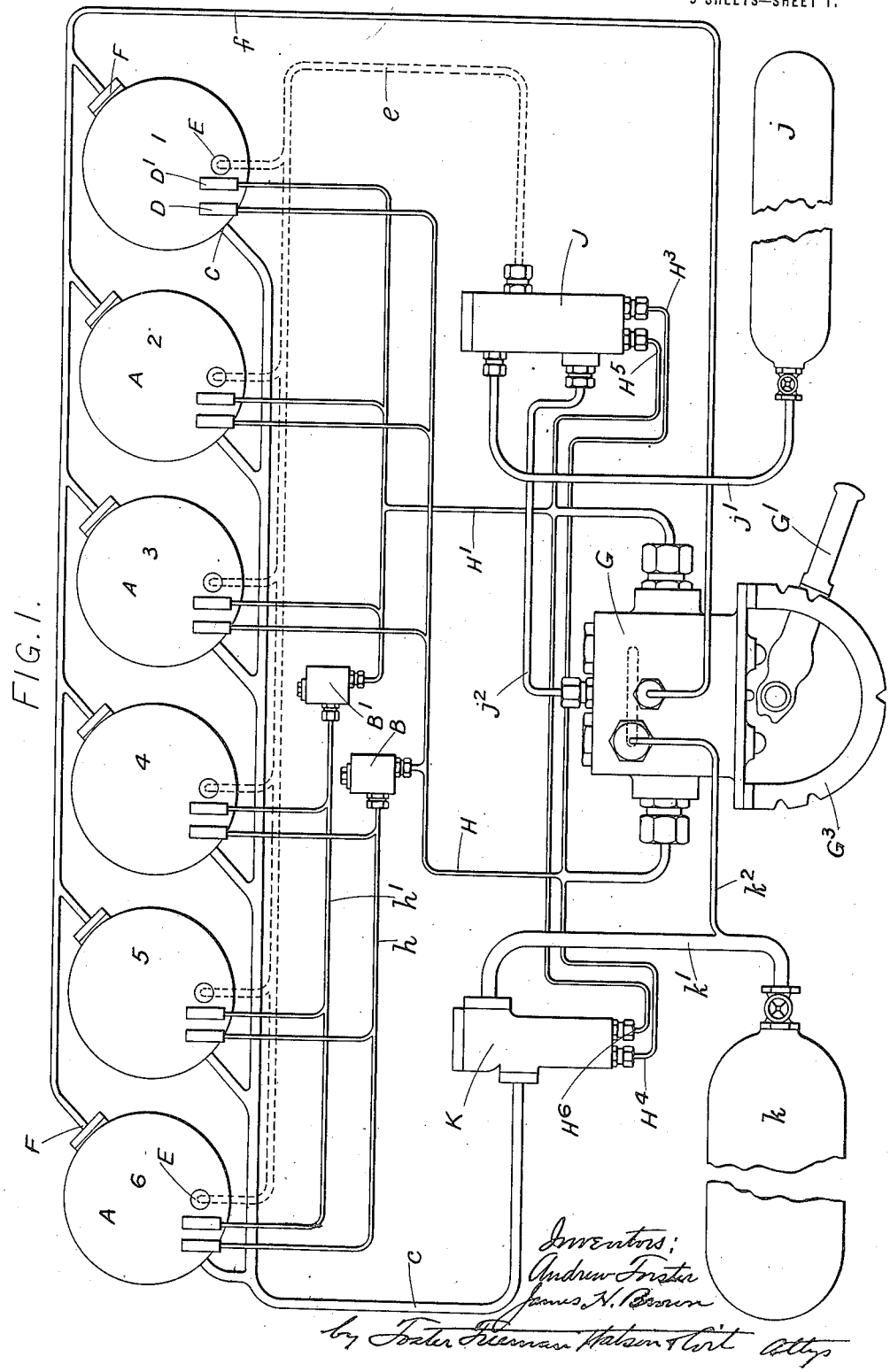

The main features of the invention as shown in Fig. 1 may be here referred to so as to explain the general arrangement of the several parts employed in the system.

Figure 12:
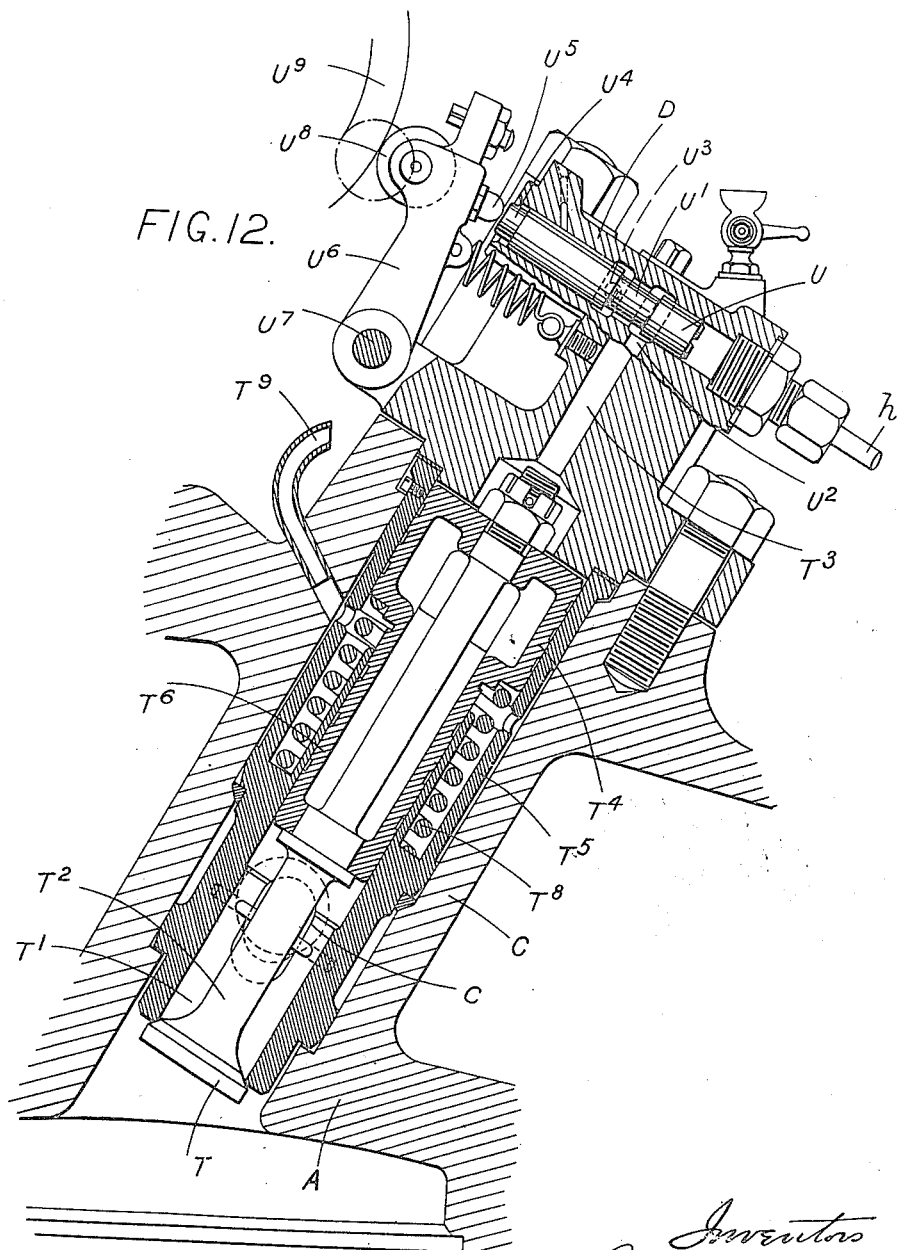
Fig. 12 is a longitudinal sectional elevation showing the preferred construction of a starting valve as employed in each cylinder and the pilot valve therefor.
Figure 13:
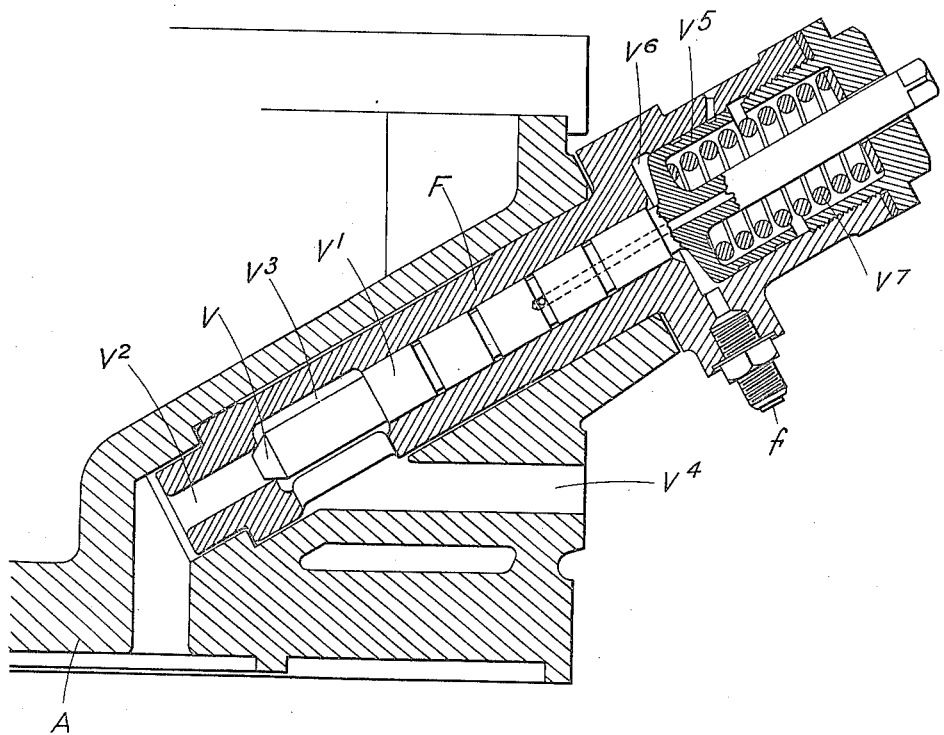
Fig. 13 is a similar view of the preferred construction of cylinder clearing and relief valve as used with this invention.

Each cylinder is provided with a starting valve C for the admission of air to the cylinder for starting purposes and the operation of this valve is controlled by a pilot valve D for starting ahead and a similar pilot valve D' for starting astern. The detail construction preferably employed in these valves is shown in Fig. 12 and will be described later with reference to that figure. Each cylinder has a fuel valve E which controls the injection of fuel by air pressure in the usual manner. The detail construction of these fuel valves may follow known lines and need not here be described. Each cylinder is also provided with the usual clearing or relief valve F the construction of which is shown in Fig. 13 and will be referred to hereafter.

Figure 3:
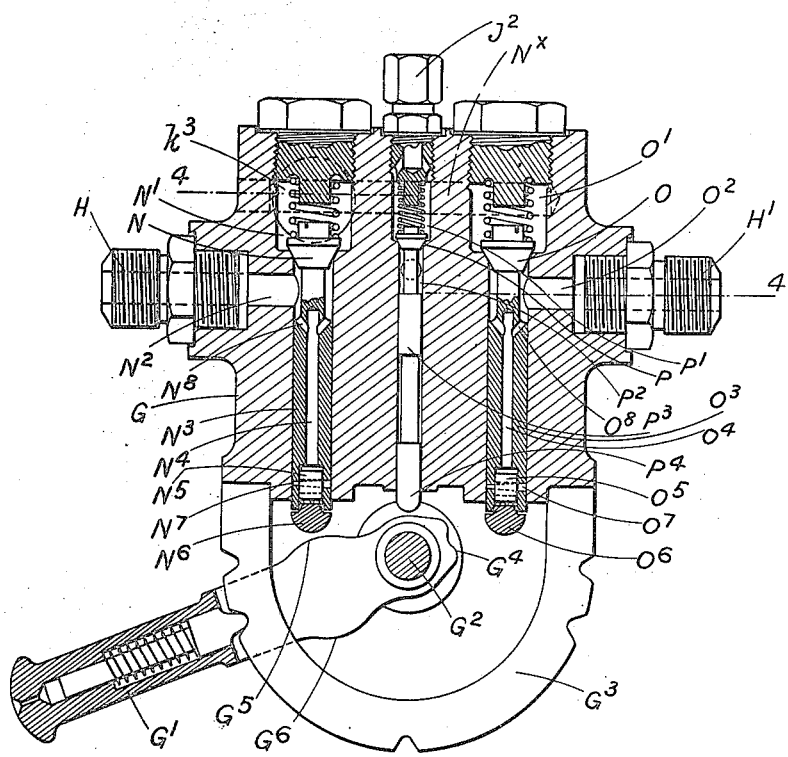
Fig. 3 is a sectional elevation of the hand operated starting and clearing valves.
Figure 4:
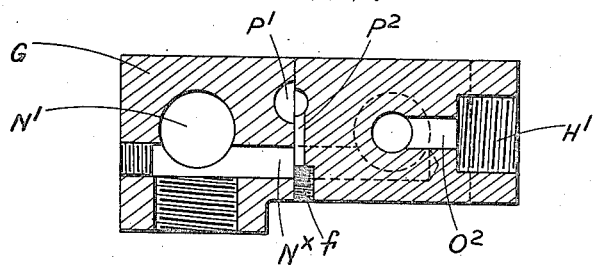
Fig. 4 is a section on the broken line 4—4 in Fig. 3 showing the formation of the valve casing only, the valves being omitted.

The hand operated valves for starting ahead and astern and for clearing are disposed in a casing G and controlled by a hand lever G' the detail constructions of these valves being shown in Figs. 3 and 4. From this casing G two air pipe systems H and H', respectively for starting ahead and astern, run to the ahead and astern pilot valves D and D' of all the cylinders A. In the ahead pipe system H is a time valve B and in the astern system H' is a similar time valve B'. Each of these time or period valves is so disposed and constructed that while the air traversing the pipe systems H and H' from the casing G can pass direct to the pilot valves D and D' of the three cylinders Nos. 1, 2 and 3, the air passing from these systems to the pilot valves of the three cylinders Nos. 4, 5 and 6 is controlled by the time valves B and B' whence lead the branching pipes $h$ and $h'$ to the pilot valves of these grouped cylinders Nos. 4, 5 and 6. The detail construction of the time valves is shown in Figs. 5, 6, 7 and 8.

Figure 9:
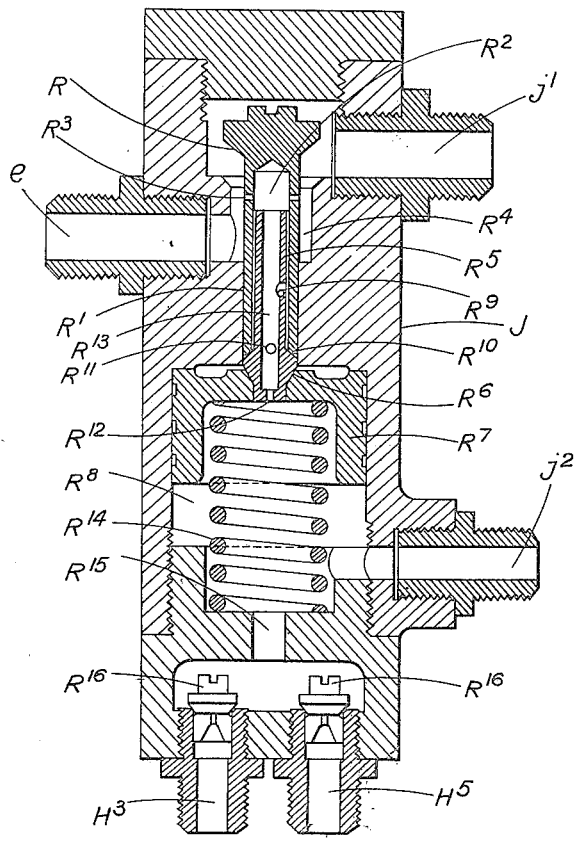
Fig. 9 is a longitudinal sectional elevation of one construction of the injection air relay valve.

The ahead air pipe system H has a branch $H^3$ which runs to a fuel injection air relay valve J and another branch $H^4$ which runs to a main starting air relay valve K. The astern air pipe system H' is also provided with similar branches namely $H^5$ running to the valve J and $H^6$ running to the valve K. Air is supplied under pressure from a flask $j$ by a pipe $j'$ to the valve J and the latter communicates by a pipe $e$ with branches with the fuel valves E of all the cylinders A. A pipe $j^2$ also runs from the valve J to the hand controlled clearing valve in the casing G. A pipe $f$ leads from this clearing valve in the casing G to all the cylinder clearing valves F. Air under pressure is supplied to the main starting air relay valve K from a flask $k$ through a pipe $k'$, which has a branch $k^2$ leading to the two hand controlled starting valves in the casing G. From the valve K the air passes to all the cylinder starting valves C through a pipe $c$ with suitable branches. The detail construction of the fuel injection air relay valve J is shown in Fig. 9 an alternative construction being shown in Fig. 10. The detail construction of the main starting air relay valve K is shown in Fig. 11.

Figure 2:
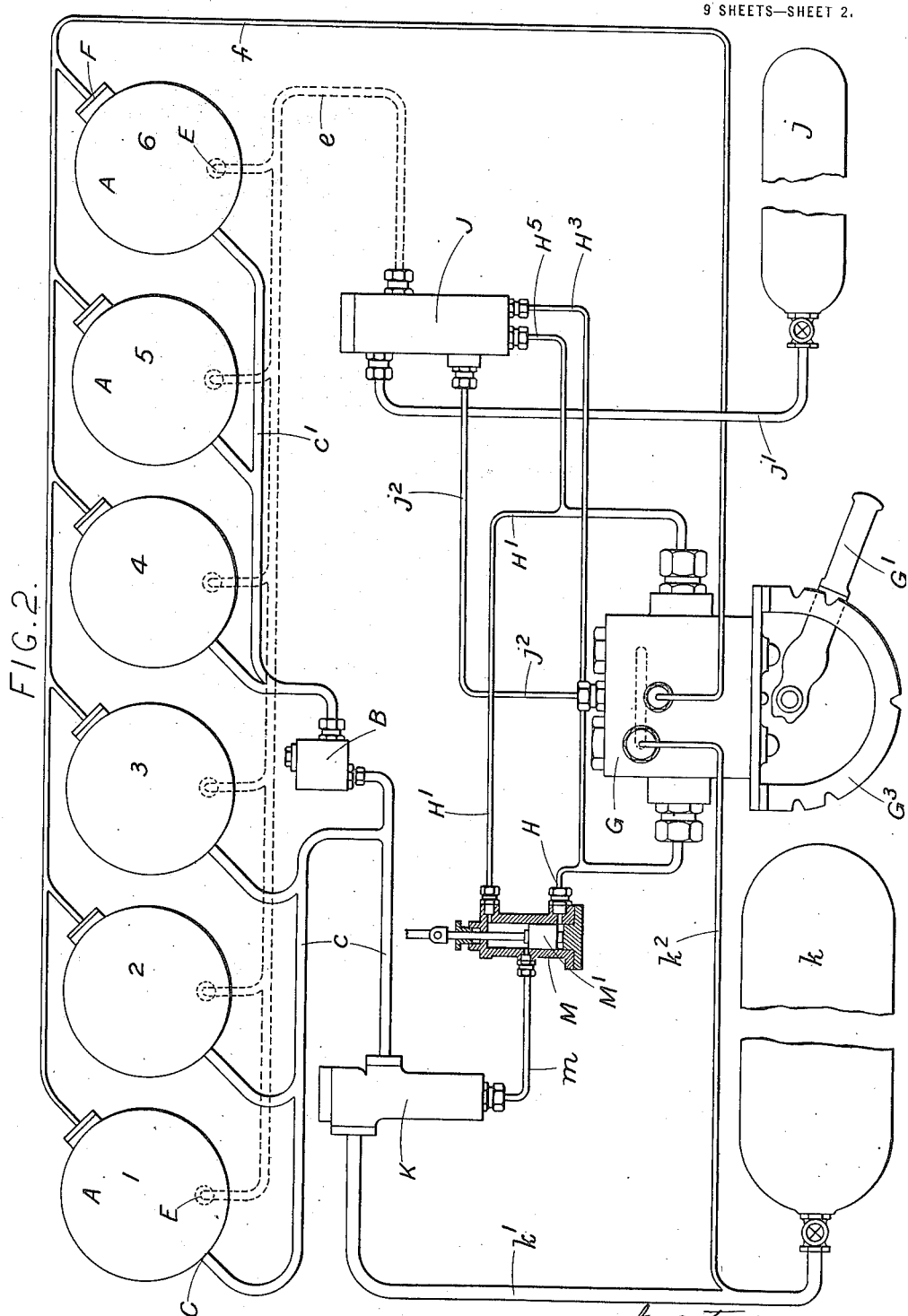
Fig. 2 is a similar view showing an alternative arrangement in which pilot valves are not used and a single time or period valve is employed.

In the modified arrangement shown in Fig. 2 the cylinder starting valves C are not provided with pilot valves and a single time or period valve B is employed which is disposed in the piping $c$ between the main starting air relay valve K and the starting valves of the cylinders Nos. 4, 5 and 6 to which the air is conveyed by branched piping $c'$. The air from the valve K can pass direct to the starting valves C of the cylinders Nos. 1, 2 and 3. In this case both pipes H and H' run from the ahead and astern hand controlled starting valves in the casing G to a cylindrical chamber M in which is a piston M' operating as a valve to control the delivery of air from either of the pipes H H' through a pipe $n$ to the valve K. The valve M M' is connected in some convenient manner to the mechanism which controls the engine valve gear for reversing purposes and this gear may be operated by the pressure of air on one side or the other of this valve piston M' according as air is admitted to the chamber M either through the pipe H for starting ahead or through the pipe H' for starting astern. On the other hand if the valve gear is set mechanically it will determine by the position of the piston M' the flow of air from either the pipe H or the pipe H' through the chamber M in accordance with the valve setting. Thus the valve gear is automatically set for going ahead or astern when the corresponding starting valve in the casing G is operated by the hand lever G' and starting air is admitted to the cylinders.

Having thus indicated the main features in the improved system and the apparatus employed the several parts and their detail constructions may be referred to.

The hand operated lever G' actuates three valves one N for starting ahead, a similar valve O for starting astern and a clearing valve P the latter being preferably situated centrally between the two starting valves as shown in Fig. 3. The hand lever G is conveniently pivoted at $G^2$ and arranged to move over a quadrant $G^3$ and is provided with three projections on which one $G^4$ is central and adapted to act on or operate the clearing valve P while each of the other projections $G^5$ and $G^6$ which are disposed laterally acts on and operates a starting valve N or O. Thus if the lever G' is moved over the quadrant $G^3$ into one extreme position for example to the left as shown in Fig. 3 the ahead starting valve N will be lifted, when the lever is moved thence into the central position the ahead starting valve will be closed and the clearing valve P will be opened so as to bring about the stoppage of the engine, and finally when the lever is moved into the other extreme position to the right the astern starting valve O will be opened. The lever G' and the projections $G^4$, $G^5$ and $G^6$ thereon are so constructed and arranged that the lever can be moved into positions intermediate on the one hand between the central "stop" or clearing position and the ahead starting position, and on the other hand between the central "stop" position and the astern starting position, and when in either of these intermediate positions the lever will be inoperative on either of the valves and is maintained so while the engine is running. The lever is shown in Fig. 3 in one of these intermediate positions.

As mentioned the starting valves N and O respectively for ahead and astern are preferably similarly constructed and arranged. Taking for example the ahead starting this comprises a conical valve N situated in a chamber N' to which air is delivered from the starting flask $k$ through the inlet $k^3$ against the face of the valve. From beneath the valve seat leads a passage $N^2$ to which is coupled the pipe H which as mentioned communicates by branches with the ahead starting pilot valves D on each cylinder A. For convenience the two pipe circuits or connections H, $h$, $H^3$, $H^4$ and H', $h'$, $H^5$, $H^6$ from the hand controlled starting valves may be referred to respectively as the ahead starting air supply circuit and the astern starting air supply circuit. The stem $N^3$ of the valve N is downwardly directed and enlarged at a suitable point in its length and formed hollow as at $N^4$ the enlarged portion being a sliding fit in a cylindrical passage running from the chamber N' containing the valve N. The delivery outlet $N^2$ opens out of this passage just below the valve seat. The outer end of the hollow valve stem $N^3$ is open and within it slides a hollow plunger $N^5$ having lateral openings beneath a head $N^6$ formed as a valve on its outer end adapted to close the end of the passage $N^4$ in the valve stem when pressed upward. The plunger and valve $N^6$ are retained in place in the end of the valve stem by a transverse pin $N^7$ which passes through a slot in the plunger $N^5$. Air from the chamber or passage $N^2$ beneath the valve can enter the passage $N^4$ in the valve stem $N^3$ through openings $N^8$ formed through the upper end of the enlarged part of this stem. The valve head $N^6$ is so disposed that it can be acted on by one of the lateral projections $G^5$ on the hand operated lever G'. Thus when this lever is moved over the quadrant $G^3$ into its extreme position to the left the projection $G^5$ will strike the valve head $N^6$ and after pressing it on to its seat in the end of the valve stem $N^3$ the valve N will be lifted off its seat and retained so as long as the hand lever G' is kept in that position. Compressed air can then flow from the starting flask $k$ into the starting air supply circuit H controlled by the valve. When the hand lever is moved from the position in which it thus operates the valve N the latter is at once seated by the action of the air pressure on the valve face and by a spring arranged as shown in the drawing. The air under pressure which then remains in the starting air supply circuit H can escape by passing through the openings $N^8$ into the passage $N^4$ in the valve stem $N^3$ and thence past the valve $N^6$ which falls away from its seating.

The hand operated valve O for starting astern is in all respects as to its construction, arrangement and operation similar to the valve N for starting ahead. Thus as will be seen in Fig. 3 the valve is situated in a chamber O' to which air is admitted from the flask $k$ through the inlet $k^3$ and through a passage $N^x$ which as is shown in Figs 3 and 4 is formed transversely within the casing G and between the chambers N' and O'. Beneath the valve is a chamber and passage $O^2$ leading to the air pipe system H'. The valve stem $O^3$ is hollowed as at $O^4$ for the greater part of its length and in the outer end of this passage in the valve stem lies the hollow plunger $O^5$ having lateral openings beneath the head $O^6$ which is formed as a valve adapted to close the passage in the stem. The valve head $O^6$ is retained in place by the transverse pin $O^7$ passing through a slot in the plunger $O^5$ so as to allow the valve to fall off its seat. Openings $O^8$ in the upper end of the valve spindle permit the air to escape from the chamber $O^2$ into the passage $O^4$ and thence to the atmosphere past the valve $O^6$.

The central clearing valve P is of the conical type and is seated in a chamber P' which communicates by the pipe $j^2$ with an automatic injection air relay valve J. The flow of air from this valve J is directed on to the face of the clearing valve P. Beneath the seat of this valve P is a passage $P^2$ which leads laterally to the pipe $f$ and by branches thereof to the clearing valves F of all the cylinders A. The stem $P^3$ of the valve P is downwardly directed and can slide in a passage formed in the casing G while the end $P^4$ of the valve stem projects from the end of the passage. On this projecting end $P^4$ acts the central cam or projection $G^4$ on the hand operated lever G'. Thus when this lever is positioned for example centrally on its quadrant $G^3$ the clearing valve P will be lifted and air can flow from the automatic injection air relay valve J through the pipes $j^2$ and $f$ to the cylinder clearing valves F which then open immediately, relieve the cylinders of all pressure and unconsumed gases and leave the engine ready to start again in either direction The two starting valves N and O and the clearing valve P may be otherwise constructed, arranged and operated if found desirable.

As already mentioned in each starting air supply circuit H $h$ and H' $h'$ is a valve B or B' positioned so as to separate the engine cylinders A into two groups for example each comprising three cylinders as above indicated. These valves are conveniently referred to as the time or period valves since each automatically determines the time or period during which starting air is supplied to one of the groups of three cylinders. The time valves may be constructed in various ways each construction however operating for the same purpose and in substantially the same manner in that when air is admitted to the circuit in which this valve is disposed the valve is first opened and air allowed to pass either direct to the starting valves C or to the pilot valves D or D' of the cylinders in the group controlled by the time valves. After a predetermined lapse of time the valve B or B' automatically closes as a result of the leakage or passage of air to the back of the valve.

One construction of time valve as shown in Fig. 5 comprises a conical valve Q formed at one end of a hollow rod or stem Q' at the other end of which is disposed a piston $Q^2$ the diameter of which is greater than the diameter of the valve stem $Q'$ and of the face of the valve $Q$. In this construction the piston $Q^2$ is formed separately from the valve stem $Q'$ the end of the latter and the face of the piston being arranged to abut. Such an arrangement simplifies the construction of these parts and the fitting of the piston in its cylinder, the fitting of the valve stem $Q'$ in the passage in which it slides and also the engagement of the valve $Q$ with its seat. The valve is seated in the end of an inlet passage $Q^3$ into which leads the pipe H from the hand controlled starting valve in the casing G and above this seat and around the valve is a chamber $Q^4$ and a lateral passage whence runs the pipe $h$ with branches leading to the valves C or pilot valves D or $D'$ of all the cylinders A in the group controlled by the time valve. The piston $Q^2$ reciprocates in a cylinder $Q^5$ of suitable length. Within the casing B and at the side of the cylinder $Q^5$ there is formed a reservoir chamber $Q^6$ the upper end of which communicates with the upper end of the cylinder $Q^5$ by a passage $Q^7$. A small opening $Q^8$ is arranged between the reservoir chamber $Q^6$ and the air passage $Q^3$ and the dimensions of this opening are such that air can leak slowly from the passage $Q^3$ into the chamber $Q^6$ and so into the cylinder $Q^5$ behind the piston $Q^2$. The dimensions or capacity of the chamber $Q^6$ is determined in relation to the rate at which air can leak or pass into it and in accordance with the time during which it is desired that the valve Q shall remain open when the engine is started. The leak orifice $Q^8$ is formed as shown in a removable plug $Q^9$ so as to permit of adjustment, interchangeable plugs with orifices of different sizes being provided. An escape opening $Q^{10}$ is formed through the valve casing B into the cylinder $Q^5$ below the piston $Q^2$.

If now the hand controlled starting valve N is lifted compressed air enters the starting air supply circuit H and the passage $Q^3$ and acts on the face of the time valve Q which is thereby lifted off its seat. The air can then flow past the valve Q through the piping $h$ to the pilot valves D or direct to the starting valves C of the cylinders Nos. 4, 5 and 6 forming the group controlled by the time valve. Simultaneously air passes relatively slowly through the small orifice $Q^8$ into the reservoir $Q^6$ and thence through the passage $Q^7$ into the cylinder $Q^5$. As soon as the pressure in the reservoir $Q^6$ and cylinder $Q^5$ equals that in the starting air supply circuit H the valve Q will close owing to its weight and the pressure of the air behind the piston $Q^2$. The valve Q will then be maintained closed by the pressure of air in the reservoir $Q^6$ acting on the face of the piston $Q^2$ whose area is greater than the face of the valve Q. Thus the supply of starting air to the cylinders Nos. 4, 5 and 6 forming the group controlled by the time valve will be shut off.

Figure 8:
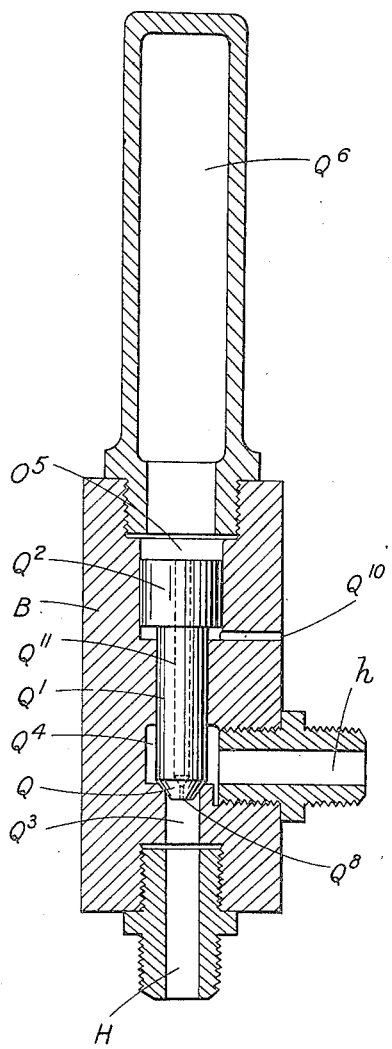
Fig. 8 is a longitudinal sectional elevation of an alternative construction of same valve.

If it is not convenient in this construction to position the reservoir $Q^6$ in the casing B so as to permit of the air leak being carried directly through the wall of the reservoir into the supply pipe $Q^3$, the reservoir may be positioned elsewhere as for instance at the end of the cylinder $Q^5$ as in the construction shown in Fig. 8 and a pipe carried from the reservoir $Q^6$ into the air passage $Q^3$. The air leak orifice $Q^8$ is then disposed at either one end or the other of this pipe or at some intermediate point in it. In either case the valve stem $Q'$ and the piston $Q^2$ are constructed and arranged so that no air can leak past the valve stem and piston into the reservoir $Q^6$.

In the alternative construction of the time valve as shown in Fig. 8 the reservoir chamber $Q^6$ is detachably mounted on the end of the cylinder $Q^5$ so that the chamber $Q^6$ constitutes a prolongation of the cylinder. Owing to the reservoir chamber being made removable its capacity and dimensions can be varied by substituting therefor other chambers of different sizes. The piston $Q^2$ is here formed integral with the valve stem $Q'$ and a passage $Q^{11}$ runs right through the valve stem and piston the small leak opening $Q^8$ being arranged through the face of the valve Q at the end of the passage $Q^{11}$. In this case the inlet H and air passage $Q^3$ lead directly against the face of the valve Q.

In either of the constructions of time valve illustrated in Figs. 5 and 8 and more particularly in that shown in Fig. 5 in place of providing a small leak orifice $Q^8$ the flow of air into the reservoir $Q^6$ may be regulated and the rate of flow controlled by the employment of a suitably arranged series of superimposed disks in each of which are one or more small holes. This arrangement is illustrated in Fig. 6. Each disk $Q^{12}$ as shown in Fig. 7 is provided with a small hole $Q^{13}$ positioned out of the center of the disk and a series of these disks are arranged one above the other alternating with rings $Q^{14}$ the disks and rings being kept in place by a removable plug $Q^9$ having a central orifice, the arrangement being clearly shown in Fig. 6. The rings $Q^{14}$ are of sufficient thickness to provide a small space between adjacent disks $Q^{12}$ while the holes $Q^{13}$ in these disks are positioned so that they do not coincide. The air leaking into the reservoir $Q^6$ has then to pass through the holes in all the series of disks and the number of the disks may be varied so as to adjust the time of closing of the valve Q.

It will be seen that the action of the time valve is the same in either of the above described alternative constructions and by this action when starting the engine the supply of starting air will be shut off automatically to certain of the cylinders A as soon as the predetermined period has elapsed. The supply of starting air to the cylinders Nos. 1, 2 and 3 which are not controlled by the time valve is maintained while fuel is delivered to the cylinders Nos. 4, 5 and 6 controlled by the time valve so that combustion can take place in these latter cylinders as the crank shaft is being rotated owing to the action of the starting air in the other cylinders.

As mentioned an automatic air injection relay valve J is provided which is in communication with and is actuated by the air pressure in both of the starting air supply circuits H and H' and this valve controls the flow of injection air to the fuel valves E of all the cylinders A of the engine. The valve itself is conveniently of the conical type seated in a chamber into which air is delivered by the pipe $j'$ from the air supply flask $j$. From a cylindrical passage or chamber beneath the seat leads the pipe $e$ with branches passing to the fuel valves E in each of the cylinders A.

The construction and arrangement adopted for the operation of this valve may vary but in each case the arrangement is such that when there is air pressure in a starting air supply circuit H or H' as a result of operation of a starting valve N or O by means of the hand lever G' this pressure will cause the injection air relay valve J to be lifted and permit air to flow from the flask $j$ to the fuel injectors E. The valve mechanism is so arranged that the valve will be maintained off its seat by a spring acting on a piston even after the flow of air through the starting air supply circuits H and H' has ceased and pressure has fallen in these circuits. The pressure chamber of the valve J is in communication with the hand operated clearing valve P and the mechanism of the valve J is such that when this clearing valve is opened and the pressure in the valve controlling chamber is relieved the valve will seat itself and the injection of fuel into the cylinders A will stop.

The following may be instanced as alternative examples of the manner in which the automatic injection air relay valve may be constructed in practice.

In one case illustrated in Fig. 9 the valve R is carried by a stem R' which springs from the center of the conical face of the valve. The stem R' is hollowed as at $R^2$ and small radial passages $R^3$ are formed through the wall of the stem from the hollow interior and open into the chamber $R^4$ beneath the valve seat so that air can flow from this chamber into the interior $R^2$ of the valve stem R'. The lower end of the hollow part of the valve stem is open and within the cylindrical interior slides a hollow plunger $R^5$ having its outer end formed conical to constitute a valve $R^6$. This valve has a seat formed around an opening in the center of a piston $R^7$ which can slide in a cylinder $R^8$ disposed in the valve casing J. The valve head $R^6$ of the sliding plunger $R^5$ and also when the valve R is seated the end of the valve stem R' thus lie in one end of this cylinder $R^8$. The outward movement of the hollow plunger $R^5$ in the valve stem R' is limited by means of a suitably arranged stop or pin $R^9$ within the valve stem R' while its inward movement is determined by a conical enlargement $R^{10}$ on the head of the plunger which can engage the coned end of the valve stem R'. A small opening $R^{11}$ is formed through the wall of the plunger $R^5$ adjacent to its head and in such a position that when the plunger has moved outwardly from the valve stem R' this opening is uncovered but when the plunger has been pushed into the valve stem the opening will be closed. There is also a small hole $R^{12}$ leading from the interior $R^{13}$ of the plunger through the center of the face of the plunger valve $R^6$. Air can thus flow from the chamber $R^4$ beneath the seat of the valve R through the openings $R^3$ into the valve stem R' and through the hollow plunger $R^5$ and opening $R^{11}$ into the end of the cylinder $R^8$ in which lies the plunger valve $R^6$ after the plunger $R^5$ has moved outwardly. Air can also leak from the interior $R^2$ of the valve stem R' and interior $R^{13}$ of the plunger $R^5$ through the small opening $R^{12}$ in the plunger valve $R^6$ to the opposite side of the piston $R^7$. This piston is acted on by a coiled spring $R^{14}$ disposed between the piston and the end $R^{15}$ of the cylinder $R^8$. The spring $R^{14}$ has sufficient strength to support the valve R, member $R^5$ and piston $R^7$ in their uppermost position when the air pressures in chambers $R^4$ and $R^8$ are equal, but it is not constructed to materially oppose the downward movement of these parts when the air pressure above valve R or in chamber $R^4$ exceeds that in chamber $R^8$. This end $R^{15}$ of the cylinder $R^8$ has two communicating passages leading thereinto each of which is controlled by a non-return valve $R^{16}$ and from these passages run the pipes $H^3$ and $H^5$ to the starting air supply circuits H and H'. A third passage from this end of the cylinder leads laterally to a union for the pipe $j^2$ which runs to the hand operated clearing valve P. Thus air under pressure when admitted to a starting air supply circuit H or H' can pass the non-return valve $R^{16}$ into the cylinder $R^8$ and act on the piston $R^7$. Similarly if the clearing valve P is opened the pressure existent beneath the piston $R^7$ in the cylinder $R^8$ can be relieved.

The action of the valve is as follows. When a hand operated starting valve N or O is opened air enters a starting air supply circuit H or H' as already described and some of this air will pass by a pipe $H^3$ or $H^5$ into the injection air relay valve cylinder $R^8$ and by acting on the piston $R^7$ will cause it to move upwardly in the cylinder. The plunger $R^5$ will thereby be pushed into the valve stem R' and the valve R itself will be lifted allowing air to flow from the supply flask $j$ through the pipes $j'$ and $e$ to the fuel valves E. The area of the piston $R^7$ is greater than the area of the upper face of the valve R on which can act directly the air flowing through the pipe $j'$ from the supply flask $j$ so that this pressure will be overcome and the lifting of the valve R can be thus effected. If there is a difference between the pressure of the air in the starting supply circuit that is to say in the cylinder $R^8$ and that passing the valve R to the cylinder fuel valves E equilibrium will be established by the leakage of air through the valve stem R' and small hole $R^{12}$ in the face of the plunger valve $R^6$ to the under side of the piston $R^7$. The valve R will then be held in its raised position by the action of the spring $R^{14}$ acting on the piston $R^7$. If it is desired to stop the engine the hand operated clearing valve P is lifted by means of the hand lever G' when the pressure beneath the piston $R^7$ is at once relieved with the result that the valve R is seated and the supply of air to the fuel valves E is cut off. There remains however in pipe $e$ air under a considerable pressure which is utilized to further move piston $R^7$ downward in cylinder $R^8$ until it is disengaged from plunger valve $R^6$, whereupon the air remaining in pipe $e$ can flow through the opening in the piston and out through pipe $j^2$ to the clearing valves. The air pressure in chamber $R^8$ is of course suddenly relieved when the clearing valve is opened and valve R promptly seats itself. A very light movement of plunger $R^5$ relatively to hollow valve stem R' is sufficient to enable air to flow through opening $R^{11}$ and the inertia of the piston and plunger is great enough to carry them downward against the pressure of spring $R^{14}$ after the valve R has been seated and to thereby open the orifice $R^{11}$. This will cause the piston $R^7$ to move still farther in the downward direction leaving the plunger valve $R^6$ behind so that it is lifted off its seat on the upper face of the piston. The air can then flow freely through the opening in the piston and thence through the pipe $j^2$ to the hand operated clearing valve P whence as above described this air which is under pressure will pass through the pipe $f$ to the several cylinder clearing valves F which will thereby be opened so as to relieve the cylinders A of all pressure and unconsumed gases. The engine is then ready to be started again in either direction.

Figure 10:
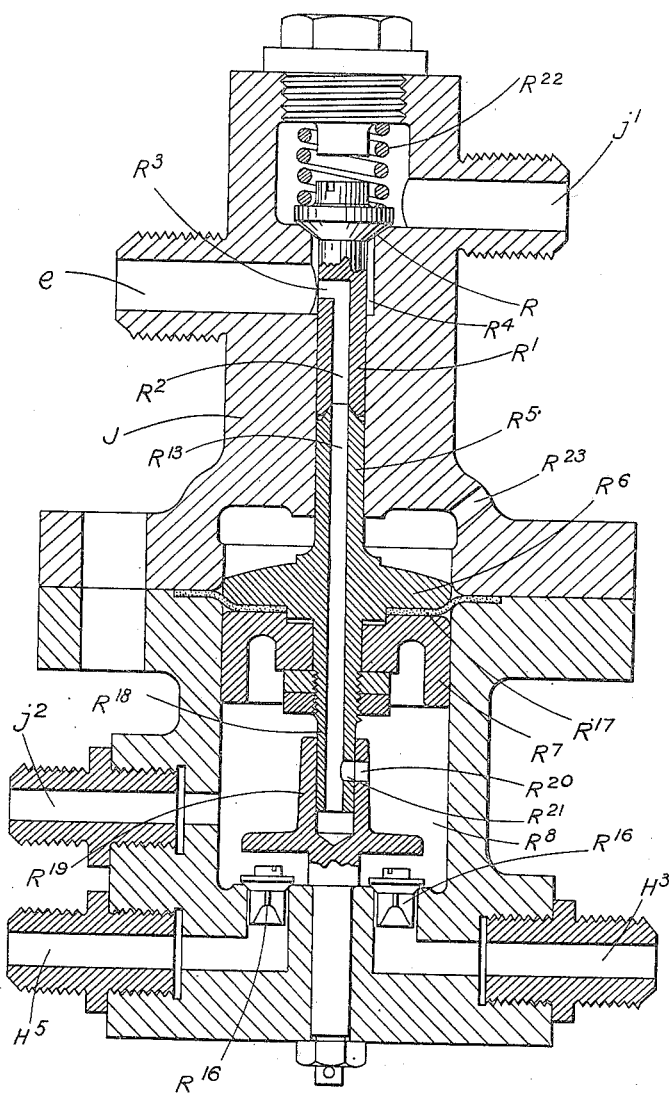
Fig. 10 is a similar view showing an alternative construction of the same valve.
Figure 11:
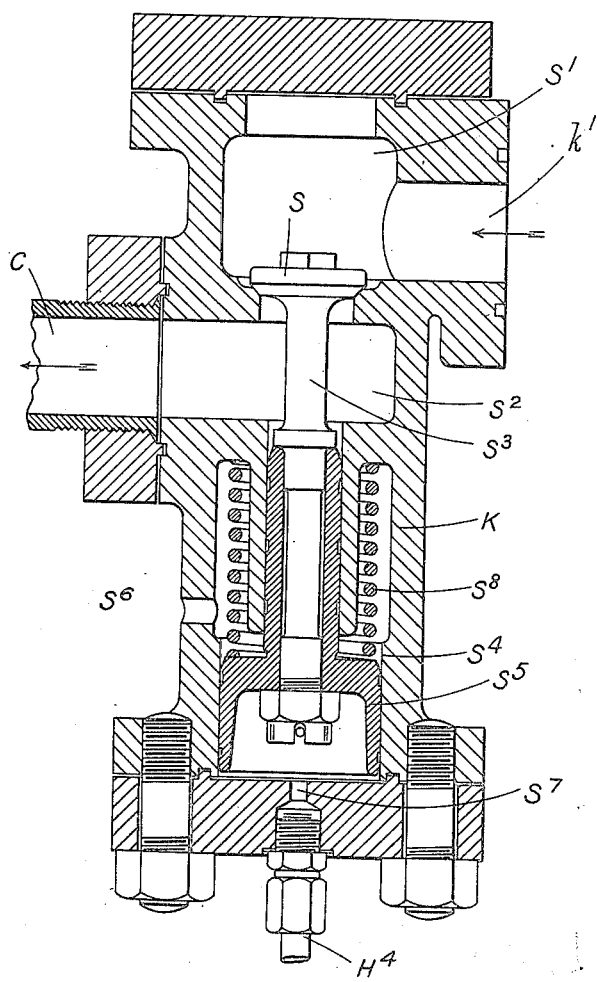
Fig. 11 is a longitudinal sectional elevation of the main starting air relay valve.

In the modified construction of the injection air relay valve as shown in Fig. 10 the piston $R^7$ is an easy fit in the cylinder $R^8$ but is rendered air tight by a flexible diaphragm $R^{17}$ suitably connected respectively to the piston and to the casing J around it and within which it moves. On its upper face the piston carries fixed to it the plunger $R^5$ which is formed of the same diameter as the valve stem R' and extends into and slides within the cylindrical passage within which also slides the stem R' of the valve R. The lower end of this valve stem abuts against the upper end of the plunger $R^5$ the abutting ends of the two parts being coned as shown to engage. The head $R^6$ of the plunger is enlarged and formed of the same diameter as the piston $R^7$ against the upper face of which the plunger head lies with the diaphragm $R^{17}$ interposed and held between these parts. An opening $R^3$ leads from the passage $R^2$ in the valve stem R' into the chamber $R^4$ beneath the seat of the valve R. The passage $R^{13}$ in the plunger $R^5$ coincides at its upper end with the lower end of the passage $R^2$ in the valve stem R'. The passage $R^{13}$ runs throughout the length of the plunger $R^5$ whose lower end $R^{18}$ extends through the piston $R^7$ to its under side where the end of the plunger slides within a sleeve $R^{19}$ which is fixed near the bottom of the cylinder $R^8$. An opening $R^{20}$ is formed through the wall of the sleeve $R^{19}$ and a corresponding opening $R^{21}$ is provided through the wall of the end portion $R^{18}$ of the plunger. These openings $R^{20}$ and $R^{21}$ will coincide when the piston $R^7$ is in its lowest position and they will then permit the free flow of air from the pipe $e$ to the cylinder $R^8$ beneath the piston $R^7$ and so to the clearing valve P through the pipe $j^2$. In this case a coiled spring $R^{22}$ is arranged in the chamber above the valve R so as to act on this valve in a direction tending to maintain it on its seat.

When one of the hand-operated starting valves N or O is lifted air under pressure coming through the pipe $H^3$ or the pipe $H^5$ and past a non-return valve $R^{16}$ will enter the cylinder $R^8$ beneath the piston $R^7$ and cause it to move upwardly in the cylinder. This will result in the valve R being lifted off its seat. Air having previously been admitted through the pipe $j'$ to the chamber above the valve R from the supply flask $j$ this air can then flow through the pipe $e$ to cylinder fuel valves E. Since the area of the piston $R^7$ is greater than the area of the face of the valve R the starting air pressure beneath the piston is sufficient to lift the valve R against the spring $R^{22}$ which acts thereon and also against the pressure of the air entering at $j'$ from the supply flask. The valve R will remain lifted while the air pressure in the cylinder $R^8$ beneath the piston $R^7$ is maintained, any leakage being made good by air which can pass from the chamber $R^4$ beneath the valve R through the passages $R^2$, $R^{13}$ to the opening $R^{21}$ in the lower end of the plunger. Though this opening $R^{21}$ will then be covered by the sleeve $R^{19}$ as the end of the plunger is an easy fit in the sleeve $R^{19}$ it will permit of some air leakage into the cylinder $R^8$. If it is desired to stop the engine the hand operated clearing valve P is opened when the pressure beneath the piston $R^7$ will be relieved through the pipe $j^2$ and the valve R will at once be seated cutting off the supply of air to the fuel valves. When the piston $R^7$ has descended the opening $R^{21}$ in the lower end $R^{18}$ of the plunger will be brought into coincidence with the opening $R^{20}$ in the wall of the sleeve $R^{19}$ and air can then pass freely from the fuel valve pipe $e$ and the chamber $R^4$ beneath the seat of the valve R. This air under pressure will flow through the cylinder $R^8$ and past the hand operated clearing valve P to the cylinder clearing valves F which will thereby be lifted. Any air that may leak past the valve stem $R'$ and plunger $R^5$ into the upper end of the cylinder $R^8$ above the diaphragm $R^{17}$ can escape through a small vent hole $R^{23}$ provided for the purpose.

There is included in the starting air supply circuit a main starting relay valve K the construction of which may conveniently be as illustrated in Fig. 11. The valve itself S is of the conical type and is seated in a chamber $S'$ to which air is supplied through the pipe $k'$ from the starting air supply flask $k$. From a chamber $S^2$ beneath the valve seat leads the pipe $c$ to the starting valves C of the engine cylinders A. The valve is carried on a rod $S^3$ which extends through a guide passage into a cylinder $S^4$ where it is connected to a piston $S^5$ movable in this cylinder. A leakage vent $S^6$ is provided through the casing K from the cylinder above the piston. Below the piston $S^5$ are two inlets $S^7$ into the cylinder respectively connected to the pipes $H^4$ and $H^6$ of the starting air supply circuits H and $H'$. A coiled spring $S^8$ in the cylinder $S^4$ above the piston $S^5$ tends to keep the valve S on its seat. When air is admitted to either of these circuits by the operation of a hand starting valve N or O the piston S will be raised and the valve S consequently lifted off its seat the pressure of air entering above the valve at $k'$ from the flask and the pressure of the spring $S^8$ being overcome by reason of the piston $S^5$ being of greater area than the face of the valve S. Air from the flask $k$ can then flow to the cylinder starting valve C and the valve S will be kept open as long as pressure is maintained beneath the piston $S^5$. The construction of this air relay valve may be modified as found desirable.

The construction of the cylinder starting valves C may vary as found desirable and they may be operated either by compressed air controlled by pilot valves or by cams acting on the starting valves according to whether the improved starting and control system is arranged as shown in Fig. 1 or as in Fig. 2. In either case the cylinder starting valves may be arranged and constructed on known lines. By way of example a convenient form of starting valve controlled by pilot valves is shown in Fig. 12.

The starting valve T is of the puppet type seated in an opening conveniently disposed in the cylinder A. The main starting air delivery pipe $c$ opens into a chamber $T'$ behind the valve. The valve stem $T^2$ extends outwardly and its outer portion $T^3$ is guided in a part of the pilot valve casing D. Mounted on the valve stem is a piston of two diameters the larger part $T^4$ of which is guided in a cylinder $T^5$ while the smaller part $T^6$ reciprocates in a guide cylinder or sleeve $T^7$ which projects into the cylinder $T^5$. A coiled spring $T^6$ acts on the under side of the larger part of the piston $T^4$ so as to press the valve on to its seat.

The pilot valves are disposed in the casing D and lie side by side and parallel to each other and move transversely with respect to the valve T. Each of these valves comprises a cylindrical member U which reciprocates in a chamber formed in the casing D the member U having in its length a part $U'$ of less diameter, the whole member U $U'$ constituting in effect a piston valve. A port $U^2$ leads into the cylinder $T^5$ behind the piston $T^4$ while two lateral ports $U^3$ open into the atmosphere. Into one end of the valve chamber leads the air pipe $h$ while the opposite end of the valve chamber is open so that the end $U^4$ of the valve can be caused to protrude from the chamber so as to be acted on by a tappet $U^5$ carried on a lever $U^6$ pivoted at $U^7$. This lever $U^6$ carries a roller $U^8$ adapted to be brought into contact with a cam $U^9$. The two pilot valves U are similarly constructed, arranged and operated and one of these is employed for starting ahead while the other is employed for starting astern the chamber in which the latter moves being connected with the pipe $h'$ but not shown in the drawing as it lies on the other side of the valve U $U'$. Thus one pivot valve is in the ahead starting pipe circuit while the other is in the corresponding circuit for starting astern.

If either of the hand controlled starting valves is operated for example the valve N air under pressure enters through the pipe $h$ and acts on the end of the pilot valve U which is thereby moved longitudinally so as to cause its end U⁴ to protrude from the casing and turn the lever U⁶ until the roller U⁸ is in a position where it can be acted on by the cam U⁹. If the cam shaft is in such a position as to allow the lever U⁶ and the valve U to move into their extreme positions the port U² will be uncovered around the inner end of the valve and air under pressure can then pass from the pipe $h$ through the port U² into the cylinder T⁵ where it will act on the piston T⁴. This piston will then be moved against the spring T⁸ and the valve T will be moved off its seat allowing air to enter the cylinder A through the pipe $c$. As the engine turns over and the cam U⁹ rotates it will act through the tappet lever U⁶ on the valve U and will move this valve inward until the port U² is closed and this port is placed in communication with the exhaust ports U³ by way of the annular space surrounding the reduced part U' of the pilot valve. Air will then be allowed to escape from behind the piston T⁴ with the result that the valve T will be seated by the action of the spring T⁸. Openings and a pipe T⁹ permit air to escape from the cylinder T⁵ beneath the piston T⁴. If the starting valve O is operated by the hand lever the other pilot valve will be similarly brought into action and suitably actuated by its cam so as to lift the starting valve T and admit air to the cylinder for going astern.

In the arrangement illustrated in Fig. 2 where no pilot valves are employed the starting valves C are constructed and operated in some known manner by cams brought into operation when the engine is to be started, the cams being set or the tappet levers adjusted by known mechanism or by the piston valve M' as the engine is to be started ahead or astern. The starting air which is led to the cylinder starting valves through the piping $c$ then enters the cylinders when the valves C are lifted by the cams from their seats.

The cylinder clearing valves F may also be constructed in various known ways but by way of example a convenient construction which may be employed is illustrated in Fig. 13.

The valve V is of the conical type and formed on the end of a valve stem V'. The valve is seated in an opening V² which leads into the cylinder A and behind the valve is a chamber V³ from which an opening V⁴ leads to the atmosphere. On the outer end of the valve spindle V' is formed a piston V⁵ movable in a cylinder V⁶ and the pipe $f$ leads from the inner end of this cylinder beneath the piston V⁵. A coiled spring V⁷ is disposed between the piston V⁵ and the outer end of the cylinder V⁶ and tends to keep the valve V on its seat. If now the clearing valve P within the casing G is lifted by movement of the hand lever G' air under pressure as already explained can pass from the injection air relay valve casing J through the pipe $j^2$ past the hand operated clearing valve P through the pipe F into the cylinder V⁶ beneath the piston V⁵. The pressure of this air will then move the piston and lift the valve V off its seat with the result that the gases from the cylinder A can escape to the atmosphere through the passage V⁴. The valve is only lifted for a short time sufficient to relieve the pressure in the cylinders. When the pressure in the pipe $f$ falls the valve V will again seat itself.

The several valves and their pipe connections may be disposed as found convenient and modified as may be desirable in accordance with the structure of the engine to which the invention is applied.

What we claim as our invention and desire to secure by Letters Patent is:—

1. In an internal combustion engine of the Diesel type the combination of a plurality of cylinders, a valve in each cylinder controlling the admission of air for starting purposes, a clearing valve in each cylinder controlling the discharge of gas therefrom, a source of supply of compressed air, pipe connections between this source of supply and the several cylinder starting valves, a fuel injection valve in each cylinder, pipe connections between the source of supply of compressed air and the several fuel injection valves, pneumatically actuated means for controlling simultaneously the admission of compressed air to all the cylinder starting valves and to all the fuel injection valves, a starting valve controlling these pneumatic means, pneumatically actuated means for operating all the cylinder clearing valves and for simultaneously shutting off the supply of air to all the fuel valves, and a clearing valve controlling these pneumatic means as set forth.

2. In an internal combustion engine of the Diesel type the combination of a plurality of cylinders, a valve in each cylinder controlling the admission of air for starting purposes, a clearing valve in each cylinder controlling the discharge of gas therefrom, a source of supply of compressed air, pipe connections between this source of supply and the several cylinder starting valves, a fuel injection valve in each cylinder, pipe connections between the source of supply of compressed air and the several fuel injection valves, pneumatically actuated means for controlling simultaneously the admission of compressed air to all the cylinder starting valves and to all the fuel injection valves, a starting valve controlling these pneumatic means, pneumatically actuated means for operating all the cylinder clearing valves and for simultaneously shutting off the supply of air to all the fuel valves, a clearing valve controlling these pneumatic means and a single hand operated lever by movement of which both the starting valve and the clearing valve are successively actuated as set forth.

3. In an internal combustion engine of the Diesel type the combination of a plurality of cylinders, a valve in each cylinder controlling the admission of air for starting purposes, a clearing valve in each cylinder controlling the discharge of gas therefrom, a source of supply of compressed air, pipe connections between this source of supply and the several cylinder starting valves, a fuel injection valve in each cylinder, pipe connections between the source of supply of compressed air and the several fuel injection valves, pneumatically actuated means for controlling simultaneously the admission of compressed air to all the cylinder starting valves and to all the fuel injection valves for starting ahead, an ahead starting valve controlling these pneumatic means, pneumatically actuated means for controlling simultaneously the admission of compressed air to all the cylinder starting valves and to all the fuel injection valves for starting astern, an astern starting valve controlling these pneumatic means, pneumatically actuated means for operating all the cylinder clearing valves and for simultaneously shutting off the supply of air to all the fuel valves, and a clearing valve controlling these pneumatic means as set forth.

4. In an internal combustion engine of the Diesel type the combination of a plurality of cylinders, a valve in each cylinder controlling the admission of air for starting purposes, a clearing valve in each cylinder controlling the discharge of gas therefrom, a source of supply of compressed air, pipe connections between this source of supply and the several cylinder starting valves, a fuel injection valve in each cylinder, pipe connections between the source of supply of compressed air and the several fuel injection valves, pneumatically actuated means for controlling simultaneously the admission of compressed air to all the cylinder starting valves and to all the fuel injection valves for starting ahead, an ahead starting valve controlling these pneumatic means, pneumatically actuated means for controlling simultaneously the admission of compressed air to all the cylinder starting valves and to all the fuel injection valves for starting astern, an astern starting valve controlling these pneumatic means, pneumatically actuated means for operating all the cylinder clearing valves and for simultaneously shutting off the supply of air to all the fuel valves, a clearing valve controlling these pneumatic means, and a single hand-operated lever by means of which the ahead starting valve and the astern starting valve and also the clearing valve are successively actuated as set forth.

5. In an internal combustion engine of the Diesel type the combination of a plurality of cylinders, a valve in each cylinder controlling the admission of air for starting purposes, a clearing valve in each cylinder controlling the discharge of gas therefrom, a source of supply of compressed air, pipe connections between this source of supply and the several cylinder starting valves, means for automatically closing the starting valves of certain of the cylinders after a predetermined time, a fuel injection valve in each cylinder, pipe connections between the source of supply of compressed air and the several fuel injection valves, pneumatically actuated means for controlling simultaneously the admission of compressed air to all the cylinder starting valves and to all the fuel injection valves, a starting valve controlling these pneumatic means, pneumatically actuated means for operating all the cylinder clearing valves and for simultaneously shutting off the supply of air to all the fuel valves, and a clearing valve controlling these pneumatic means as set forth.

6. In an internal combustion engine of the Diesel type the combination of a plurality of cylinders, a valve in each cylinder controlling the admission of air for starting purposes, a clearing valve in each cylinder controlling the discharge of gas therefrom, a source of supply of compressed air, pipe connections between this source of supply and the several cylinder starting valves, means for automatically closing the starting valves of certain of the cylinders after a predetermined time, a fuel injection valve in each cylinder, pipe connections between the source of supply of compressed air and the several fuel injection valves, pneumatically actuated means for controlling simultaneously the admission of compressed air to all the cylinder starting valves and to all the fuel injection valves for starting ahead, an ahead starting valve controlling these pneumatic means, pneumatically actuated means for controlling simultaneously the admission of compressed air to all the cylinder starting valves and to all of the fuel injection valves for starting astern, an astern starting valve controlling these pneumatic means, pneumatically actuated means for operating all the cylinder clearing valves and for simultaneously shutting off the supply of air to all the fuel valves, and a fuel valve controlling these pneumatic means as set forth.

7. In an internal combustion engine of the Diesel type the combination of a plurality of cylinders, a valve in each cylinder controlling the admission of air for starting purposes, a clearing valve in each cylinder controlling the discharge of gas therefrom, a source of supply of compressed air, pipe connections between this source of supply and the several cylinder starting valves, a fuel injection valve in each cylinder, pipe connections between the source of supply of compressed air and the several fuel injection valves, a fuel injection air relay valve serving to control the passage of compressed air from the source of supply to the several fuel injection valves, pneumatically actuated means for controlling the admission of compressed air to all the cylinder starting valves and for simultaneously actuating the fuel injection air relay valve, a starting valve controlling these pneumatic means, pneumatically actuated means for operating all the cylinder clearing valves and for simultaneously shutting the fuel injection air relay valve, and a clearing valve controlling these pneumatic means as set forth.

8. In an internal combustion engine of the Diesel type the combination of a plurality of cylinders, a valve in each cylinder controlling the admission of air for starting purposes, a clearing valve in each cylinder controlling the discharge of gas therefrom, a source of supply of compressed air, pipe connections between this source of supply and the several cylinder starting valves, a fuel injection valve in each cylinder, pipe connections between the source of supply of compressed air and the several fuel injection valves, a fuel injection air relay valve serving to control the passage of compressed air from the source of supply to the several fuel injection valves, pneumatically actuated means for controlling the admission of compressed air to all the cylinder starting valves and for simultaneously actuating the fuel injection air relay valve for starting ahead, an ahead starting valve controlling these pneumatic means, pneumatically actuated means for controlling the admission of compressed air to all the cylinder starting valves and for simultaneously actuating the fuel injection air relay valve for starting astern, an astern starting valve controlling these pneumatic means, pneumatically actuated means for operating all the cylinder clearing valves and for simultaneously shutting the fuel injection air relay valve, and a clearing valve controlling these pneumatic means as set forth.

9. In an internal combustion engine of the Diesel type the combination of a plurality of cylinders, a valve in each cylinder controlling the admission of air for starting purposes, a clearing valve in each cylinder controlling the discharge of gas therefrom, a source of supply of compressed air, pipe connections between this source of supply and the several cylinder starting valves, means for automatically closing the starting valves of certain of the cylinders after a predetermined time, a fuel injection valve in each cylinder, pipe connections between the source of supply of compressed air and the several fuel injection valves, a fuel injection air relay valve serving to control the passage of compressed air from the source of supply to the several fuel injection valves, pneumatically actuated means for controlling the admission of compressed air to all the cylinder starting valves and for simultaneously actuating the fuel injection air relay valve, a starting valve controlling these pneumatic means, pneumatically actuated means for operating all the cylinder clearing valves and for simultaneously shutting the fuel injection air relay valve, and a clearing valve controlling these pneumatic means as set forth.

10. In an internal combustion engine of the Diesel type the combination of a plurality of cylinders, a valve in each cylinder controlling the admission of air for starting purposes, a clearing valve in each cylinder controlling the discharge of gas therefrom, a source of supply of compressed air, pipe connections between this source of supply and the several cylinder starting valves, means for automatically shutting off the supply of air to the starting valves of certain of the cylinders after a predetermined time, a fuel injection valve in each cylinder, pipe connections between the source of supply of compressed air and the several fuel injection valves, a fuel injection air relay valve serving to control the passage of compressed air from the source of supply to the several fuel injection valves, pneumatically actuated means for controlling the admission of compressed air to all the cylinder starting valves and for actuating the fuel injection air relay valve for starting ahead, an ahead starting valve controlling these pneumatic means, pneumatically actuated means for controlling the admission of compressed air to all the cylinder starting valves and to the fuel injection air relay valve for starting astern, an astern starting valve controlling these pneumatic means, pneumatically actuated means for operating all the cylinder clearing valves and for shutting the fuel injection air relay valve, and a clearing valve controlling these pneumatic means as set forth.

11. In an internal combustion engine of the Diesel type the combination of a plurality of cylinders, a valve in each cylinder controlling the admission of air for starting purposes, pilot valves each of which controls the admission of air for actuating a cylinder starting valve, a clearing valve in each cylinder controlling the discharge of gas therefrom, a source of supply of compressed air, pipe connections between this source of supply and the several cylinder starting valves, a second set of pipe connections between this source of supply and the several pilot valves, which pipe connections serve to convey to the pilot valves compressed air by means of which these valves are rendered operative and the starting valves are actuated, a fuel injection valve in each cylinder, pipe connections between the source of supply of compressed air and the several fuel injection valves, pneumatically actuated means for controlling simultaneously the passage of compressed air to all the cylinder starting valves and to all the fuel injection valves, a single starting valve which controls these pneumatic means and also the passage of compressed air to the pilot valves, pneumatically actuated means for operating all the cylinder clearing valves and for simultaneously shutting off the supply of air to all the fuel valves, and a clearing valve controlling these pneumatic means as set forth.

12. In an internal combustion engine of the Diesel type the combination of a plurality of cylinders, a valve in each cylinder controlling the admission of air for starting purposes, two pilot valves for each cylinder respectively operative for starting ahead and for starting astern and controlling the admission of air for actuating the cylinder starting valve, a clearing valve in each cylinder controlling the discharge of gas therefrom, a source of supply of compressed air, pipe connections between this source of supply and the several cylinder starting valves, a second set of pipe connections between this source of supply and the several pilot valves for starting ahead, a duplicate of the second set of pipe connections extending between the source of supply and the several pilot valves for starting astern both these duplicate sets of pipe connections serving to convey respectively to the ahead and astern pilot valves compressed air by means of which these pilot valves are rendered operative and the starting valves are actuated, a fuel injection valve in each cylinder, pipe connections between the source of supply of compressed air and the several fuel injection valves, pneumatically actuated means for controlling simultaneously the passage of compressed air to all the cylinder starting valves and to all the fuel injection valves for starting ahead, an ahead starting valve which controls these pneumatic means and also the passage of compressed air to the ahead pilot valves, pneumatically actuated means for controlling simultaneously the passage of compressed air to all the cylinder starting valves and to all the fuel injection valves for starting astern, an astern starting valve which controls these pneumatic means and also the passage of compressed air to the astern pilot valves, pneumatically actuated means for operating all the cylinder clearing valves and for simultaneously shutting off the supply of air to all the fuel valves, and a clearing valve controlling these pneumatic means as set forth.

13. In an internal combustion engine of the Diesel type the combination of a plurality of cylinders, a valve in each cylinder controlling the admission of air for starting purposes, pilot valves each of which controls the admission of air for actuating a cylinder starting valve, a clearing valve in each cylinder controlling the discharge of gas therefrom, a source of supply of compressed air, pipe connections between this source of supply and the several cylinder starting valves, a second set of pipe connections between this source of supply and the several pilot valves which pipe connections serve to convey to the pilot valves compressed air by means of which these valves are rendered operative and the starting valves are actuated, means for automatically shutting off the supply of air to the pilot valves of certain of the cylinders after a predetermined time so that the starting valves of these cylinders are closed and maintained closed, a fuel injection valve in each cylinder, pipe connections between the source of supply of compressed air and the several fuel injection valves, pneumatically actuated means for controlling simultaneously the passage of compressed air to all the cylinder starting valves and to all the fuel injection valves, a single starting valve which controls these pneumatic means and also the passage of compressed air to the pilot valves, pneumatically actuated means for operating all the cylinder clearing valves and for simultaneously shutting off the supply of air to all the fuel valves, and a clearing valve controlling these pneumatic means as set forth.

14. In an internal combustion engine of the Diesel type the combination of a plurality of cylinders, a valve in each cylinder controlling the admission of air for starting purposes, two pilot valves for each cylinder respectively operative for starting ahead and for starting astern and controlling the admission of air for actuating the cylinder starting valve, a clearing valve in each cylinder controlling the discharge of gas therefrom, a source of supply of compressed air, pipe connections between this source of supply and the several cylinder starting valves, a second set of pipe connections between this source of supply and the several pilot valves for starting ahead, a duplicate of the second set of pipe connections extending between the source of supply and the several pilot valves for starting astern both of these duplicate sets of pipe connections serving to convey respectively to the ahead and astern pilot valves compressed air by means of which these pilot valves are rendered operative and the starting valves are actuated, a valve in each of the pipe connections to the pilot valves operative respectively to automatically shut off the supply of air to the ahead pilot valves and to the astern pilot valves of certain of the cylinders after a predetermined time so that the starting valves of these cylinders are closed and maintained closed, a fuel injection valve in each cylinder, pipe connections between the source of supply of compressed air and the several fuel injection valves, pneumatically actuated means for controlling simultaneously the passage of compressed air to all the cylinder starting valves and to all the fuel injection valves for starting ahead, an ahead starting valve which controls these pneumatic means and also the passage of compressed air to the ahead pilot valves, pneumatically actuated means for controlling simultaneously the passage of compressed air to all the cylinder starting valves and to all the fuel injection valves for starting astern, an astern starting valve which controls these pneumatic means and also the passage of compressed air to the astern pilot valves, pneumatically actuated means for operating all the cylinder clearing valves and for simultaneously shutting off the supply of air to all the fuel valves and a clearing valve controlling these pneumatic means as set forth.

15. In an internal combustion engine of the Diesel type the combination of a plurality of cylinders, a valve in each cylinder controlling the admission of air for starting purposes, pilot valves each of which controls the admission of air for actuating a cylinder starting valve, a clearing valve in each cylinder controlling the discharge of gas therefrom, a source of supply of compressed air, pipe connections between this source of supply and the several cylinder starting valves, a second set of pipe connections between this source of supply and the several pilot valves which pipe connections serve to convey to the pilot valves compressed air by means of which these valves are rendered operative and the starting valves are actuated, a fuel injection valve in each cylinder, pipe connections between the source of supply of compressed air and the several fuel injection valves, a fuel injection air relay valve serving to control the passage of compressed air from the source of supply to the several fuel injection valves, pneumatically actuated means for controlling the passage of compressed air to all the cylinder starting valves and for simultaneously actuating the fuel injection air relay valve, a single starting valve which controls these pneumatic means and also the passage of compressed air to the pilot valves, pneumatically actuated means for operating all the cylinder clearing valves and for simultaneously shutting the fuel injection air relay valve, and a clearing valve controlling these pneumatic means as set forth.

16. In an internal combustion engine of the Diesel type the combination of a plurality of cylinders, a valve in each cylinder controlling the admission of air for starting purposes, two pilot valves for each cylinder respectively operative for starting ahead and for starting astern and controlling the admission of air for actuating the cylinder starting valve, a clearing valve in each cylinder controlling the discharge of gas therefrom, a source of supply of compressed air, pipe connections between this source of supply and the several cylinder starting valves, a second set of pipe connections between this source of supply and the several pilot valves for starting ahead, a duplicate of the second set of pipe connections extending between the source of supply and the several pilot valves for starting astern, both these duplicate sets of pipe connections serving to convey respectively to the ahead and astern pilot valves compressed air by means of which these pilot valves are rendered operative and the starting valves are actuated, a fuel injection valve in each cylinder, pipe connections between the source of supply of compressed air and the several fuel injection valves, a fuel injection air relay valve serving to control the passage of compressed air from the source of supply to the several fuel injection valves, pneumatically actuated means for controlling the passage of compressed air to all the cylinder starting valves and for simultaneously actuating the fuel injection air relay valve for starting ahead, an ahead starting valve which controls these pneumatic means and also the passage of compressed air to the ahead pilot valves, pneumatically actuated means for controlling the passage of compressed air to all the cylinder starting valves and for simultaneously actuating the fuel injection air relay valve for starting astern, an astern starting valve which controls these pneumatic means and also the passage of compressed air to the astern pilot valves, pneumatically actuated means for operating all the cylinder clearing valves and for simultaneously shutting the fuel injection air relay valve, and a clearing valve controlling these pneumatic means as set forth.

17. In an internal combustion engine of the Diesel type the combination of a plurality of cylinders, a valve in each cylinder controlling the admission of air for starting purposes, pilot valves each of which controls the admission of air for actuating a cylinder starting valve, a clearing valve in each cylinder controlling the discharge of gas therefrom, a source of supply of compressed air, pipe connections between this source of supply and the several cylinder starting valves, a second set of pipe connections between this source of supply and the several pilot valves which pipe connections serve to convey to the pilot valves compressed air by means of which these valves are rendered operative and the starting valves are actuated, means for automatically shutting off the supply of air to the pilot valves of certain of the cylinders after a predetermined time so that the starting valves of these cylinders are closed and maintained closed, a fuel injection valve in each cylinder, pipe connections between the source of supply of compressed air and the several fuel injection valves, a fuel injection air relay valve serving to control the passage of compressed air from the source of supply to the several fuel injection valves, pneumatically actuated means for controlling the passage of compressed air to all the cylinder starting valves and for simultaneously actuating the fuel injection air relay valve, a single starting valve which controls these pneumatic means and also the passage of compressed air to the pilot valves, pneumatically actuated means for operating all the cylinder clearing valves and for simultaneously shutting the fuel injection air relay valve, and a clearing valve controlling these pneumatic means as set forth.

18. In an internal combustion engine of the Diesel type the combination of a plurality of cylinders, a valve in each cylinder controlling the admission of air for starting purposes, two pilot valves for each cylinder respectively operative for starting ahead and for starting astern and controlling the admission of air for actuating the cylinder starting valve, a clearing valve in each cylinder controlling the discharge of gas therefrom, a source of supply of compressed air, pipe connections between this source of supply and the several cylinder starting valves, a second set of pipe connections between this source of supply and the several pilot valves for starting ahead, a duplicate of the second set of pipe connections extending between the source of supply and the several pilot valves for starting astern, both these duplicate sets of pipe connections serving to convey respectively to the ahead and astern pilot valves compressed air by means of which these pilot valves are rendered operative and the starting valves are actuated, a valve in each of the pipe connections to the pilot valves operative respectively to automatically shut off the supply of air to the ahead pilot valves and to the astern pilot valves of certain of the cylinders after a predetermined time so that the starting valves of these cylinders are closed and maintained closed, a fuel injection valve in each cylinder, pipe connections between the source of supply and the several fuel injection valves, a fuel injection air relay valve serving to control the passage of compressed air from the source of supply to the several fuel injection valves, pneumatically actuated means for controlling the passage of compressed air to all the cylinder starting valves and for simultaneously actuating the fuel injection air relay valve for starting ahead, an ahead starting valve which controls these pneumatic means and also the passage of compressed air to the ahead pilot valves, pneumatically actuated means for controlling the passage of compressed air to all the cylinder starting valves and for simultaneously actuating the fuel injection air relay valve for starting astern, an astern starting valve which controls these pneumatic means and also the passage of compressed air to the astern pilot valves, pneumatically actuated means for operating all the cylinder clearing valves and for simultaneously shutting the fuel injection air relay valve, and a clearing valve controlling these pneumatic means as set forth.

19. In an internal combustion engine of the Diesel type the combination of a plurality of cylinders, a valve in each cylinder controlling the admission of air for starting purposes, a clearing valve in each cylinder controlling the discharge of gas therefrom, a source of supply of compressed air, pipe connections between this source of supply and the several cylinder starting valves, an automatic time valve positioned in these pipe connections and adapted to be opened when air under pressure is admitted beneath the valve and closed after a predetermined time by pressure of the air when this has gained access to and can act on a piston behind the valve this valve serving to control the operation of the starting valves of certain of the cylinders, a fuel injection valve in each cylinder, pipe connections between the source of supply of compressed air and the several fuel injection valves, pneumatically actuated means for controlling simultaneously the admission of compressed air to all the cylinder starting valves and to all the fuel injection valves, a starting valve controlling these pneumatic means, pneumatically actuated means for operating all the cylinder clearing valves and for simultaneously shutting off the supply of air to all the fuel valves, and a clearing valve controlling these pneumatic means as set forth.

20. In an internal combustion engine of the Diesel type the combination of a plurality of cylinders, a valve in each cylinder controlling the admission of air for starting purposes, a clearing valve in each cylinder controlling the discharge of gas therefrom, a source of supply of compressed air, pipe connections between this source of supply and the several cylinder starting valves, two automatic time valves positioned in separate circuits in these pipe connections and respectively operative when starting ahead and when starting astern each of these valves being adapted to be opened when air under pressure is admitted beneath the valve and closed after a predetermined time by the pressure of the air when this has gained access to and can act on a piston behind the valve these valves serving to control the operation of the starting valves of certain of the cylinders, a fuel injection valve in each cylinder, pipe connections between the source of supply of compressed air and the several fuel injection valves pneumatically actuated means for controlling simultaneously the admission of compressed air to all the cylinder starting valves and to all the fuel injection valves for starting ahead, an ahead starting valve controlling these pneumatic means, pneumatically actuated means for controlling simultaneously the admission of compressed air to all the cylinder starting valves and to all the fuel injection valves for starting astern, and an astern starting valve controlling these pneumatic means, pneumatically actuated means for operating all the cylinder clearing valves and for simultaneously shutting off the supply of air to all the fuel valves, and a clearing valve controlling these pneumatic means as set forth.

21. In an internal combustion engine of the Diesel type the combination of a plurality of cylinders, a valve in each cylinder controlling the admission of air for starting purposes, pilot valves each of which controls the admission of air for actuating a cylinder starting valve, a clearing valve in each cylinder controlling the discharge of gas therefrom, a source of supply of compressed air, pipe connections between this source of supply and the several cylinder starting valves, a second set of pipe connections between this source of supply and the several pilot valves which pipe connections serve to convey to the pilot valves compressed air by means of which these valves are rendered operative and the starting valves are actuated, an automatic time valve disposed in this second set of pipe connections and adapted to be opened when air under pressure is admitted beneath the time valve and closed after a predetermined time by the pressure of the air when this has gained access to and can act on a piston behind the valve this valve serving to control the passage of air to the pilot valves of certain of the cylinders so that after a predetermined time the starting valves of these cylinders are closed and maintained closed, a fuel injection valve in each cylinder, pipe connections between the source of supply of compressed air and the several fuel injection valves, pneumatically actuated means for controlling simultaneously the passage of compressed air to all the cylinder starting valves and all the fuel injection valves, a single starting valve which controls these pneumatic means and also the passage of compressed air to the pipe connections leading to the time valve and pilot valves, pneumatically actuated means for operating all the cylinder clearing valves and for simultaneously shutting off the supply of air to all the fuel valves, and a clearing valve controlling these pneumatic means as set forth.

22. In an internal combustion engine of the Diesel type the combination of a plurality of cylinders, a valve in each cylinder controlling the admission of air for starting purposes, two pilot valves for each cylinder respectively operative for starting ahead and for starting astern and controlling the admission of air for actuating the cylinder starting valve, a clearing valve in each cylinder controlling the discharge of gas therefrom, a source of supply of compressed air, pipe connections between this source of supply and the several cylinder starting valves, a second set of pipe connections between this source of supply and the several pilot valves for starting ahead, a duplicate of the second set of pipe connections extending between the source of supply and the several pilot valves for starting astern, both these duplicate sets of pipe connections serving to convey respectively to the ahead and astern pilot valves compressed air by means of which these pilot valves are rendered operative and the starting valves are actuated, an automatic time valve in each of the pipe connections to the pilot valves each time valve being adapted to be opened when air under pressure is admitted beneath the valve and closed after a predetermined time by the pressure of the air when this has gained access to and can act on a piston behind the valve these time valves respectively serving to control the supply of air to the ahead pilot valves and to the astern pilot valves of certain of the cylinders so that after a predetermined time the starting valves in these cylinders are closed and maintained closed, a fuel injection valve in each cylinder, pipe connections between the source of supply of compressed air and the several fuel injection valves pneumatically actuated means for controlling simultaneously the passage of compressed air to all the cylinder starting valves and fuel injection valves for starting ahead, and ahead starting valve which controls these pneumatic means and also the passage of compressed air through the pipes leading to the ahead pilot valves and the time valve controlling certain of these pilot valves, pneumatically actuated means for controlling simultaneously the passage of compressed air to all the cylinder starting valves and to all the fuel injection valves for starting astern, an astern starting valve which controls these pneumatic means and also the passage of compressed air through the pipes leading to the astern pilot valves and the time valve controlling certain of these pilot valves, pneumatically actuated means for operating all the cylinder clearing valves and for simultaneously shutting off the supply of air to the fuel valves, and a clearing valve controlling these pneumatic means as set forth.

23. In an internal combustion engine of the Diesel type the combination of a plurality of cylinders, a starting air valve in each cylinder actuated by compressed air, pilot valves for each cylinder starting air valve and respectively operative for starting ahead or astern each pilot valve being actuated by compressed air and serving to control the actuation of a starting valve, a source of supply of compressed air, a system of pipes serving to convey air from the source of supply to the several cylinder starting valves, a pneumatically actuated starting air relay valve in this pipe system, a fuel injection valve in each cylinder, a system of pipes serving to convey air from the source of supply to the several fuel injection valves, a pneumatically actuated injection air relay valve in this pipe system, two pipe systems serving to convey air from the source of supply respectively to the ahead pilot valves and the astern pilot valves of the several cylinder starting valves, an automatic time valve in each pilot valve pipe system controlling the flow of air to the pilot valves of certain of the cylinders, pipe connections between each pilot valve pipe system and the starting air relay valve and the injection air relay valve and serving to convey to these valves air for actuating them, a pneumatically actuated clearing valve in each cylinder, two starting valves respectively controlling the passage of air into and from the ahead and astern pilot valve systems, a clearing valve serving to control the flow of air from the injection air relay valve casing to the cylinder clearing valves whereby the relay valve is closed and the cylinder clearing valves are opened, pipes running from the injection air relay valve to the clearing valve and thence to the several cylinder clearing valves, and a single lever serving to operate successively the ahead starting valve the clearing valve and the astern starting valve as set forth.

24. In an internal combustion engine of the Diesel type the combination of a plurality of cylinders, a starting valve in each cylinder actuated by compressed air, pilot valves for each cylinder starting air valve and respectively operative for starting ahead and astern each pilot valve being actuated by compressed air and serving to control the actuation of a starting valve, a source of supply of compressed air, a system of pipes serving to convey air from the source of supply to the several cylinder starting valves, a pneumatically actuated starting air relay valve in this pipe system, a fuel injection valve in each cylinder, a system of pipes serving to convey air from the source of supply to the several fuel injection valves, a pneumatically actuated injection air relay valve in this pipe system, two pipe systems serving to convey air from the source of supply respectively to the ahead pilot valve and the astern pilot valves of the several cylinder starting valves, an automatic time valve in each pilot valve pipe system each time valve being adapted to be opened when air under pressure is admitted beneath the valve and closed after a predetermined time by the pressure of the air when this has gained access to and can act on a piston behind the valve each time valve serving to control the flow of air to the pilot valves of certain cylinders, pipe connections between each pilot valve pipe system and the starting air relay valve and the injection air relay valve and serving to convey to these valves air for actuating them, a pneumatically actuated clearing valve in each cylinder, two starting valves respectively controlling the passage of air into and from the ahead and astern pilot valve pipe systems, a clearing valve serving to control the flow of air from the injection air relay valve casing to the cylinder clearing valves whereby the relay valve is closed and the cylinder clearing valves are opened, pipes running from the injection air relay valve to the clearing valve and thence to the several cylinder clearing valves, and a single lever serving to operate successively the ahead starting valve the clearing valve and the astern starting valve as set forth.

In testimony whereof we have signed our names to this specification.

ANDREW FORSTER.
JAMES HENRY BROWN.